United States Patent
Zamsky et al.

(10) Patent No.: US 8,117,400 B2
(45) Date of Patent: Feb. 14, 2012

(54) SYSTEM AND METHOD FOR FETCHING AN INFORMATION UNIT

(75) Inventors: Ziv Zamsky, Ra'anana (IL); Moshe Anschel, Kafr-Sabe (IL); Alon Eldar, Ra'anana (IL); Dmitry Flat, Petah Tikva (IL); Kostantin Godin, Herzelia (IL); Itay Peled, Herzelia (IL); Dvir Peleg, Givatyim (IL)

(73) Assignee: Freescale Semiconductor, Inc., Austin, TX (US)

(*) Notice: Subject to any disclaimer, the term of this patent is extended or adjusted under 35 U.S.C. 154(b) by 347 days.

(21) Appl. No.: 12/446,413

(22) PCT Filed: Oct. 20, 2006

(86) PCT No.: PCT/IB2006/053875
§ 371 (c)(1),
(2), (4) Date: Apr. 20, 2009

(87) PCT Pub. No.: WO2008/047180
PCT Pub. Date: Apr. 24, 2008

(65) Prior Publication Data
US 2010/0325366 A1    Dec. 23, 2010

(51) Int. Cl.
*G06F 12/00* (2006.01)
(52) U.S. Cl. .................................. 711/142; 711/135
(58) Field of Classification Search .............. 711/142, 711/135
See application file for complete search history.

(56) References Cited

U.S. PATENT DOCUMENTS

| | | | |
|---|---|---|---|
| 4,853,846 A | 8/1989 | Johnson et al. | |
| 5,742,790 A | 4/1998 | Kawasaki | |
| 5,742,831 A | 4/1998 | Creta | |
| 5,953,538 A | 9/1999 | Duncan et al. | |
| 6,021,468 A | 2/2000 | Arimilli et al. | |
| 6,081,873 A | 6/2000 | Hetherington et al. | |
| 6,233,656 B1 | 5/2001 | Jones et al. | |
| 6,249,520 B1 | 6/2001 | Steely, Jr. et al. | |
| 6,272,597 B1 | 8/2001 | Fu et al. | |
| 6,374,330 B1 | 4/2002 | Arimilli et al. | |
| 5,455,924 A1 | 3/2003 | Shenoy et al. | |
| 6,574,714 B2 | 6/2003 | Arimilli et al. | |
| 6,662,275 B2 | 12/2003 | Arimill et al. | |
| 6,848,030 B2 | 1/2005 | Tokar et al. | |
| 2001/0027515 A1* | 10/2001 | Ukai et al. | 712/207 |
| 2002/0069326 A1 | 6/2002 | Richardson et al. | |
| 2005/0154838 A1* | 7/2005 | DeWitt et al. | 711/144 |
| 2006/0026353 A1* | 2/2006 | Lesot et al. | 711/118 |
| 2006/0059312 A1 | 3/2006 | Peled et al. | |
| 2006/0080509 A1* | 4/2006 | Averill et al. | 711/134 |

FOREIGN PATENT DOCUMENTS
EP    0949569    10/1999

OTHER PUBLICATIONS

Hennesy et al: "Computer Architecture. A quanative approach, passage."

* cited by examiner

*Primary Examiner* — Michael Tran

(57) ABSTRACT

A device and a method for fetching an information unit, the method includes: receiving a request to execute a write through cacheable operation of the information unit; emptying a fetch unit from data, wherein the fetch unit is connected to a cache module and to a high level memory unit; determining, when the fetch unit is empty, whether the cache module stores an older version of the information unit; and selectively writing the information unit to the cache module in response to the cache module in response to the determination.

17 Claims, 9 Drawing Sheets

SYSTEM AND METHOD FOR FETCHING AN INFORMATION UNIT

FIELD OF THE INVENTION

The present invention relates to methods and devices for fetching an information unit, and especially to methods and devices for retrieving an information unit by cache module that supports speculative fetch and write through policy.

BACKGROUND OF THE INVENTION

Cache modules are high-speed memories that facilitate fast retrieval of information including data and instructions. Typically, cache modules are relatively expensive and are characterized by a small size, especially in comparison to higher-level memory modules.

The performance of modern processor-based systems usually depends upon the cache module performances and especially to a relationship between cache hits and cache misses. A cache hit occurs when an information unit that is present in a cache module memory is requested. A cache miss occurs when the requested information unit is not present in the cache module and has to be fetched from another memory that is termed a higher-level memory module.

Various cache module and processor architectures, as well as data retrieval schemes, were developed over the years, to meet increasing performance demands. These architectures included multi-port cache modules, multi-level cache module architecture, super scalar type processors and the like.

The following U.S. patents and U.S. patent applications, all being incorporated herein by reference, provide a brief summary of some state of the art cache modules and data fetch methods: U.S. Pat. No. 4,853,846 of Johnson et al., titled "Bus expander with logic for virtualizing single cache control into dual channels with separate directories and prefetch for different processors"; U.S. patent application 20020069326 of Richardson et al., titled "Pipelines non-blocking level two cache system with inherent transaction collision-avoidance"; U.S. Pat. No. 5,742,790 of Kawasaki titled "Detection circuit for identical and simultaneous access in a parallel processor system with a multi-way multi-port cache"; U.S. Pat. No. 6,081,873 of Hetherington et al., titled "In-line bank conflict detection and resolution in a multi-ported non-blocking cache"; and U.S. Pat. No. 6,272,597 of Fu et al., titled "Dual-ported, pipelined, two level cache system".

Processors and other information requesting components are capable of requesting information from a cache module and, alternatively or additionally, from another memory module that can be a higher-level memory module. The higher-level memory module can also be a cache memory, another internal memory and even an external memory.

There are various manners to write information into a cache module or a higher-level memory module. Write-through involves writing one or more information units to the cache module and to the higher-level memory module substantially simultaneously.

Some prior art cache modules include multiple lines that in turn are partitioned to segments. Each segment is associated with a validity bit and a dirty bit. A valid bit indicates whether a certain segment includes valid information. The dirty bit indicates if the segment includes valid information that was previously updated but not sent to the higher-level memory module. If a write back policy is implemented only the segments that are associated with an asserted dirty bit are written to the high-level memory module.

Some prior art cache modules perform mandatory fetch operations and speculative fetch operations. The latter are also known as pre-fetch operations. A mandatory fetch operation involves fetching an information unit that caused a cache miss. The speculative fetch operations are aimed to reduce cache miss events, and replace not-valid segments with valid segments.

When applying both speculative fetch operations and write-through policy the high-level memory module can replace an updated segment residing in the cache memory with a non-updated segment. This can cause a coherency problem.

The following U.S. patents and patent applications illustrate various devices and systems for solving coherency problems: U.S. Pat. Nos. 6,574,714, 6,662,275, 6,021,468 and 6,374,330 of Arimilli et al; U.S. Pat. No. 6,868,482 of Mackenthum et al.; U.S. Pat. No. 6,249,520 of Steely et al.; U.S. Pat. No. 5,953,538 of Duncan; U.S. Pat. No. 6,233,656 of; and U.S. Pat. No. 6,848,030 of.

There is a need to provide an efficient method and device for fetching information to a cache module.

SUMMARY OF THE PRESENT INVENTION

Method and system for fetching an information unit, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The following description related to data fetch operations and to a data cache module.

The device is adapted to delay a cache miss/hit determination until a fetch unit is empty (does not store data), thus solving a possible coherency problem. In this case even if an older version of the information unit is pre-fetched after the processor provides a newer version of that information unit, the delayed hit/miss check will detect the older version of the data unit and the cache module will overwrite this older version.

Figure 1:
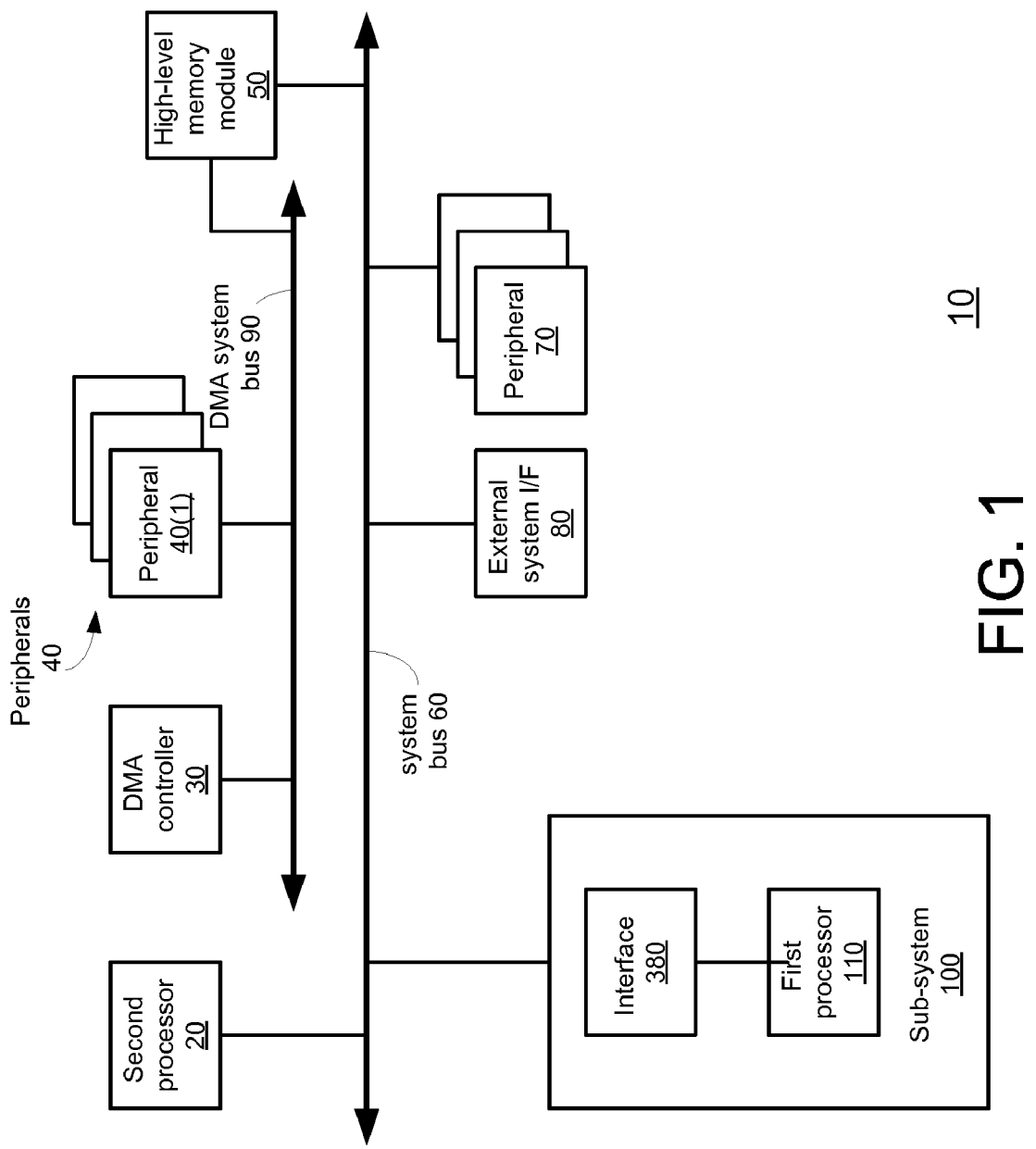
FIG. 1 is a schematic diagram of a device, according to an embodiment of the invention.

FIG. 1 illustrates a device 10 according to an embodiment of the invention. Device 10 includes a sub-system 100 that in turn includes a first requesting component such as first processor 110 and also includes a multi-port data cache module (denoted 200 in FIG. 2). Device 10 further includes a system bus 60 that is connected to: (i) a second requesting entity such as second processor 20, (ii) high-level memory module 50, (iii) sub-system 100, (iv) peripherals 70, and (v) an external system I/F 80.

The high-level memory module 50 is an example of another memory module that is accessible by processor 110. It usually stores programs and data for the various processors. It can also be a second level cache memory module supporting off-chip memories, but this is not necessarily so. If a cache miss occurs the data can be fetched from the high-level memory module 50 or from other memory modules.

System bus 60 is connected to sub-system 100, via a gasket (also referred to as interface) 380. Various fetch operation utilize interface 380.

Device 10 also includes a DMA system bus 90 that is connected to a DMA controller 30, to multiple peripherals 40 and to the shared memory module 370, via DMA interface 382. The DMA system bus 90 can be used by external components, such as processor 20 to access the shared memory module 370.

Figure 2:
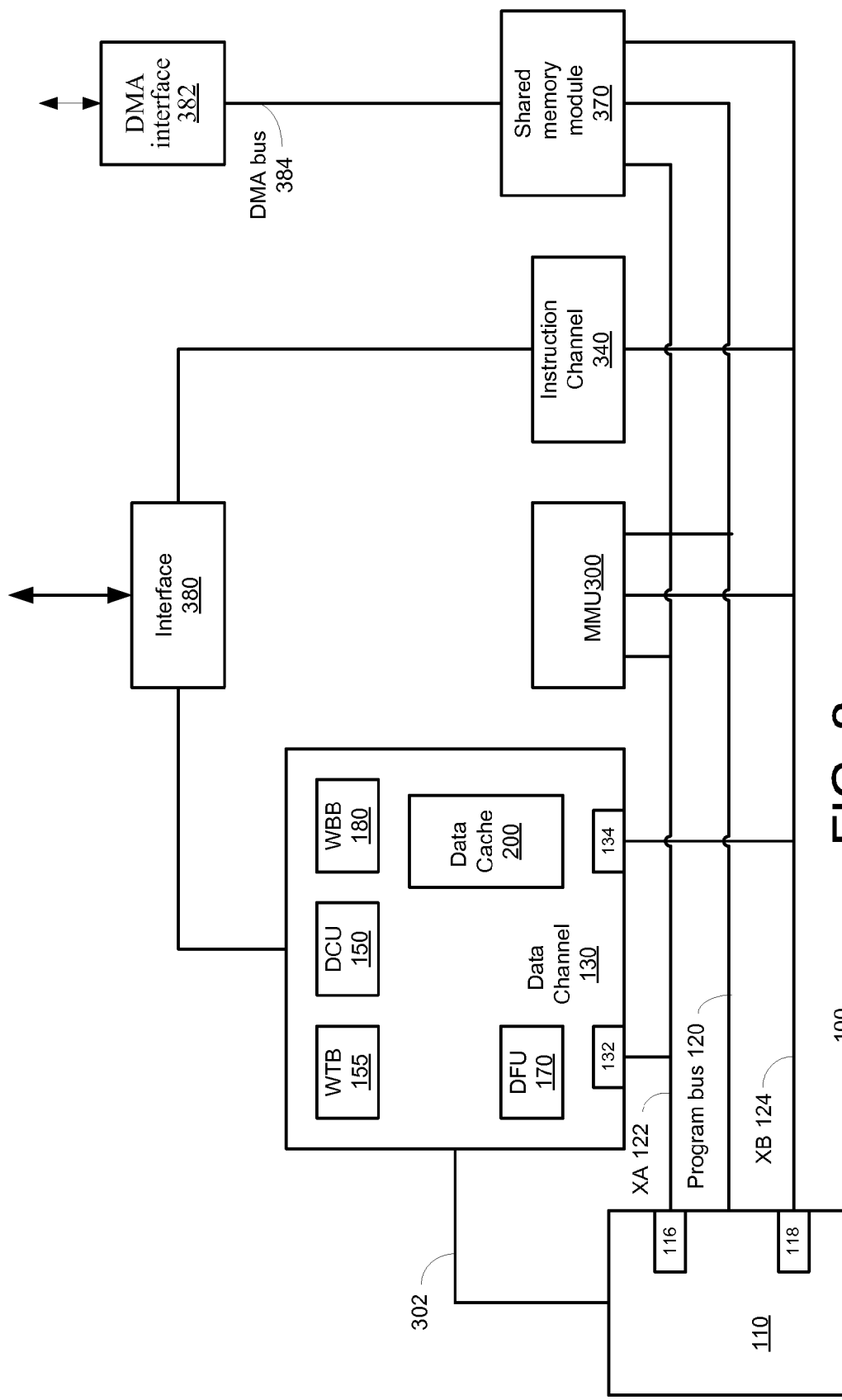
FIG. 2 is a schematic diagram of a sub-system, according to an embodiment of the invention.

FIG. 2 illustrates a sub-system 100 of device 10, according to an embodiment of the invention. Sub-system 100 includes a processor 110, data channel 130, Memory Management Unit (MMU) 300, instruction channel 340, level-one RAM memory 370 as well as interface unit 380.

Processor 110 and the instruction channel 340 are connected to program bus 120. Instruction channel 340 includes an instruction cache and an instruction fetch unit. MMU 300 is adapted to translate virtual to physical addresses as well as generate various cache and bus control signals.

Processor 110 includes first data port 116 and second data port 118. The first data port 116 is connected, via first data bus (XA) 122 to a first port 132 of the channel 130, to MMU 300 and to the level-one RAM memory 370. The second data port 118 is connected, via second data bus (XB) 124 to a second port 134 of the data channel 130, to MMU 300 and to the level-one RAM memory 370. Processor 110 is capable of generating two data addresses per cycle.

The data channel 130 is connected, via data fetch bus 126, to an interface 380 that in turn is connected to one or more additional memories such as the high-level memory 50. Additional memories can be a part of a multi-level cache architecture, whereas the data cache module 200 is the first level cache module and the other memories are level two cache memories. They can also be a part of an external memory that is also referred to as a main memory.

Data channel 130 includes a data cache module 200, and multiple supporting units such as Write Through Buffer (WTB 155), a Data Fetch Unit (DFU) 170, optional Write Back Buffer (WBB) 180 and Data Control Unit (DCU) 150. DFU 170 is responsible for data fetching and pre-fetching. Data fetching operations can include mandatory fetching operations and speculated fetching operations. Mandatory fetching operations include retrieving a data unit that caused a cache miss. Speculated fetching (also termed pre-fetching) operations include retrieving data units that did not cause a cache miss. Usually this latter type of data is expected to be used soon after the pre-fetch. This expectation is usually based on an assumption that many data requests are sequential in nature.

It is assumed that each fetch operation involves fetching a single basic data unit (BDU). Accordingly, a BDU that is fetched during a mandatory fetch operation is referred to as a mandatory BDU and a BDU that is fetched during a speculated fetch operation is referred to as a speculated BDU. It is further noted that the size of BDU can depend upon the memory module from which it is initially fetched, but for simplicity of explanation it is assumed that all the BDUs have the same size.

WBB 180 temporarily saves data written into the main memory in a write-back operation. Write back operation occurs when data that was previously written into the data cache module 200 is replaced.

Processor 110 is capable of issuing two data requests simultaneously, via buses XA 122 and XB 124. The data channel 130 processes these requests to determine if one or more cache hit occurred. Basically, the data channel 130 can decide that the two data requests resulted in a cache hit, the both request resulted in a cache miss or that one request resulted in a cache hit while the other resulted in a cache miss.

According to an embodiment of the invention processor 110 is stalled until it receives all the data it requested, but this is not necessarily so. For example, according to another embodiment of the invention, only portions of the processor are stalled.

There are various manners for starting and ending the stalling stage. A cache miss can trigger entrance to such a stage. It is assumed that processor 110 enters a stalled stage once it receives a cache miss indication from data channel 130. Processor 110 exits the stall stage once it receives an indication from the data channel 130 that the requested data is available. Line 302, connecting between processor 110 and data channel 130 conveys a stall signal that can cause processor 110 to enter a stalled stage and exit such a stage.

Figure 3:
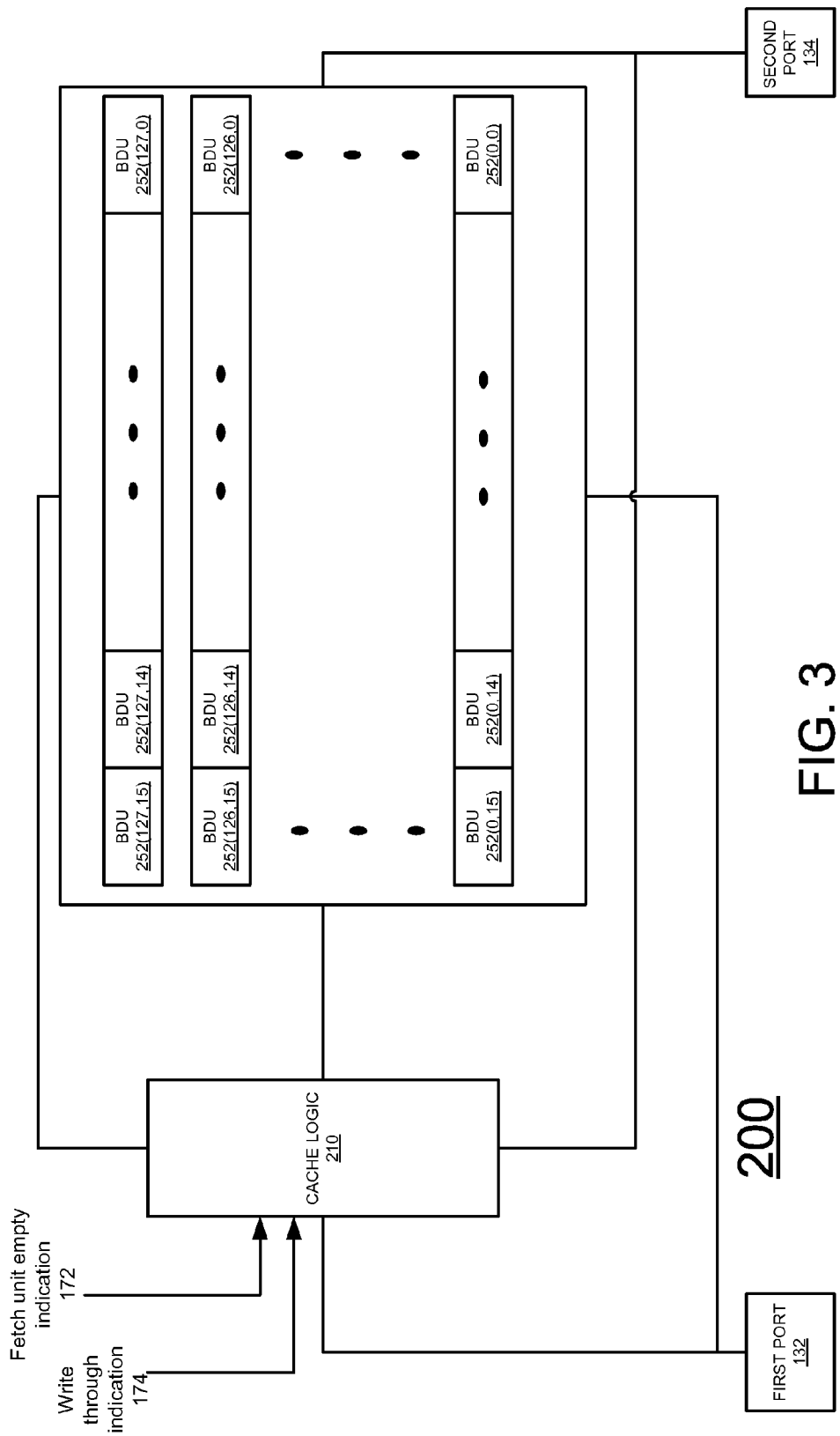
FIG. 3 is a schematic illustration of a data cache module, according to an embodiment of the invention.

FIG. 3 is a schematic illustration of data cache module 200, according to an embodiment of the invention. Data cache module 200 includes logic, such as cache logic 210 and cache memory bank 250. The cache memory bank 250 includes one hundred and twenty-eight lines 250(0)-250(127), each line includes sixteen 128-bit long basic data units. These basic data units (BDUs) are denoted 252(0,0)-252(127,15). A cache hit or cache miss is determined on a BDU basis. It is noted that the logic can be located outside the cache module, but this is not necessarily so.

Cache logic 210 also receives a fetch unit empty indication 172 that indicates that the fetch unit 170 is empty. This indicates that there are no more information units that are being fetched by a speculative fetch operation. If an older version of an information unit was pre-fetched after a more updated version of the information unit is provided by processor 110, the cache logic 210 will perform a hit/miss check after the older version is written to the cache module and will overwrite the older version.

Figure 4:
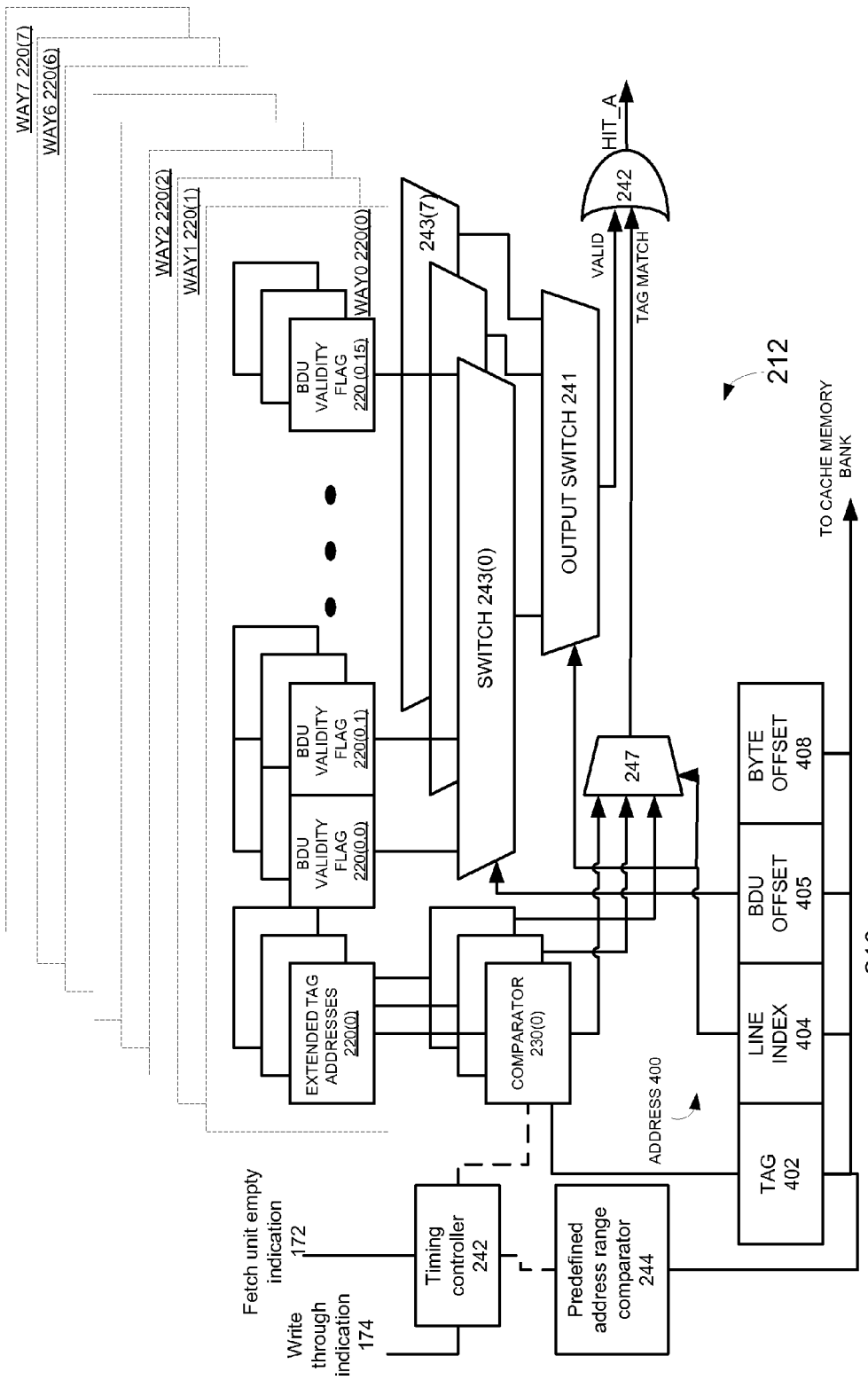
FIG. 4 is a schematic illustration of cache logic, according to an embodiment of the invention.

FIG. 4 is a schematic illustration of a portion 212 of cache logic 210, according to an embodiment of the invention. Cache logic 210 is capable of managing two data requests simultaneously and includes two identical portions, 212 and 214, each is capable of determining whether a single cache hit or cache miss has occurred. For simplicity of explanation only a first portion 212 of the cache logic 210 is illustrated in detail.

Cache logic 210 receives fetch unit empty indication 172 and can delay a hit/miss determination until receiving such indication. The delay can include delaying a comparison by various comparators 230(0)-230(7), the retrieval of validity bits and can also delay the output of HIT signal by logic gate 246. This delay can be implemented by timing controller 242.

According to an embodiment of the invention cache logic 210 also includes a predefined address comparator 244 that can compare the address of the information unit (or a portion of said address) to a predefined range of addresses to determine whether the delaying of the hit/miss decision is required. Predefined address comparator 244 can send an appropriate disable/enable signal to timing controller 242.

The cache logic 210 includes eight ways denoted WAY0-WAY7 220(0)-220(7). Each way stores address and status information that is associated with sixteen lines. The address information includes a tag address and the status information includes BDU validity and update information. For simplicity of information only WAY0 220(0) is illustrated in detail, while the other ways are represented by boxes 220(1)-220(7).

Each line is associated with an extended tag value and with sixteen BDU validity bits, representative of a validity of each BUD within that line. WAY0 220 stores sixteen extended tag addresses 220(0)-220(15), as well as sixteen sets of sixteen BDU validity flags 220(0,0)-220(15,15).

Each BDU can also be associated with dirty bits that indicate if a BDU was modified without being written to the higher-level memory module.

Once processor 110 provides a address 400 over the first data bus XA 122 the first portion 212 of cache logic 210 processes this address to determine whether the requested data is stored at the cache module (cache hit) or not (cache miss). If a cache hit occurs the requested data is sent to processor 110 over an appropriate data bus out of XA 122 or XB 124. Else, the DFU 170 is notified about the cache miss.

Address 400 is partitioned to a 20-bit tag address 402 that includes the twenty most significant bits of address 400, a 4-bit line index 404, a BDU offset 405 and a 4-bit byte offset 408. The 4-bit byte offset is used for data retrieval from the cache memory bank 250. The cache module 200 can be addressed by virtual addresses, while the higher-level memory module is accessed by physical addresses. Accordingly, the MMU 300 performs address translation only when BDUs are fetched from the high-level memory module 50.

Each of the sixteen tag addresses 220(0)-220(15) stored within WAY0 220 is compared, in parallel, by comparators 230(0-230(7), to an extended 28-bit tag address 410 that includes the 20-bit tag address 402 as well as an 8-bit DID 414. Those of skill in the art will appreciate that such a comparison takes place at all ways in parallel. Comparison results from each of these comparators are sent to multiplexer 247 that selects a comparison result in response to line index 404. The selected result (denoted TAG MATCH) is provided to one input of OR gate 242.

In addition, the BDU offset 408 and the 4-bit line index 404 are used to retrieve a validity flag that corresponds to the requested BDU. The 4-bit line index 404 is used for selecting a set of BDU validity flags out of the sixteen sets of WAY0, while the 4-bit BDU offset 408 is used for selecting a validity flag out of the selects set of BUD validity flags.

The selection is done by multiple switches 243(1)-243(7) and by output switch 241. Each switch out of multiple switches 243(1)-243(7) is connected to BDU validity flags of a single way and is controlled by BDI offset 405. Output switch 241 is connected to the output of multiple multiplexers 241(0)-241(7) and is controlled by line index 404. The output of output switch 241 is connected to a second input of OR gate 242 and is referred to as VALID.

OR gate 242 outputs a CACHE_HIT/MISS_A signal. A cache hit occurs if there is a match between one of the stored tag addresses and the extended tag address and if the selected BDU is valid.

DFU 170 receives an indication of a cache hit and a cache miss. If both data requests resulted in a cache hit the DFU 170 is not required to perform a mandatory fetch. If only one or more of the data requests resulted in a cache miss the DFU 170 is required to perform one or more mandatory fetch operations.

Fetch bus 126 allows fetching a single BDU per fetch operation. A typical fetch burst includes four consecutive fetch operations, thus a total of four BDUs can be retrieved during a single fetch burst.

Typically, memory modules that are adapted to perform fetch burst are partitioned to fixed sized data unit sets. A fetch burst that includes a request to receive a certain data unit will amount in a retrieval of that set. The order of fetched data units depends upon the specific requested data set.

Sub-system 100 is configured in a manner that a fetch burst cannot be interrupted. Thus, if more than a single cache miss occurs simultaneously, there is a great benefit in retrieving more than one mandatory BDU during a single fetch burst. This efficient fetching scheme can reduce the processor stall period, especially as processor 110 is stalled until it receives both mandatory BDUs.

Figure 5:
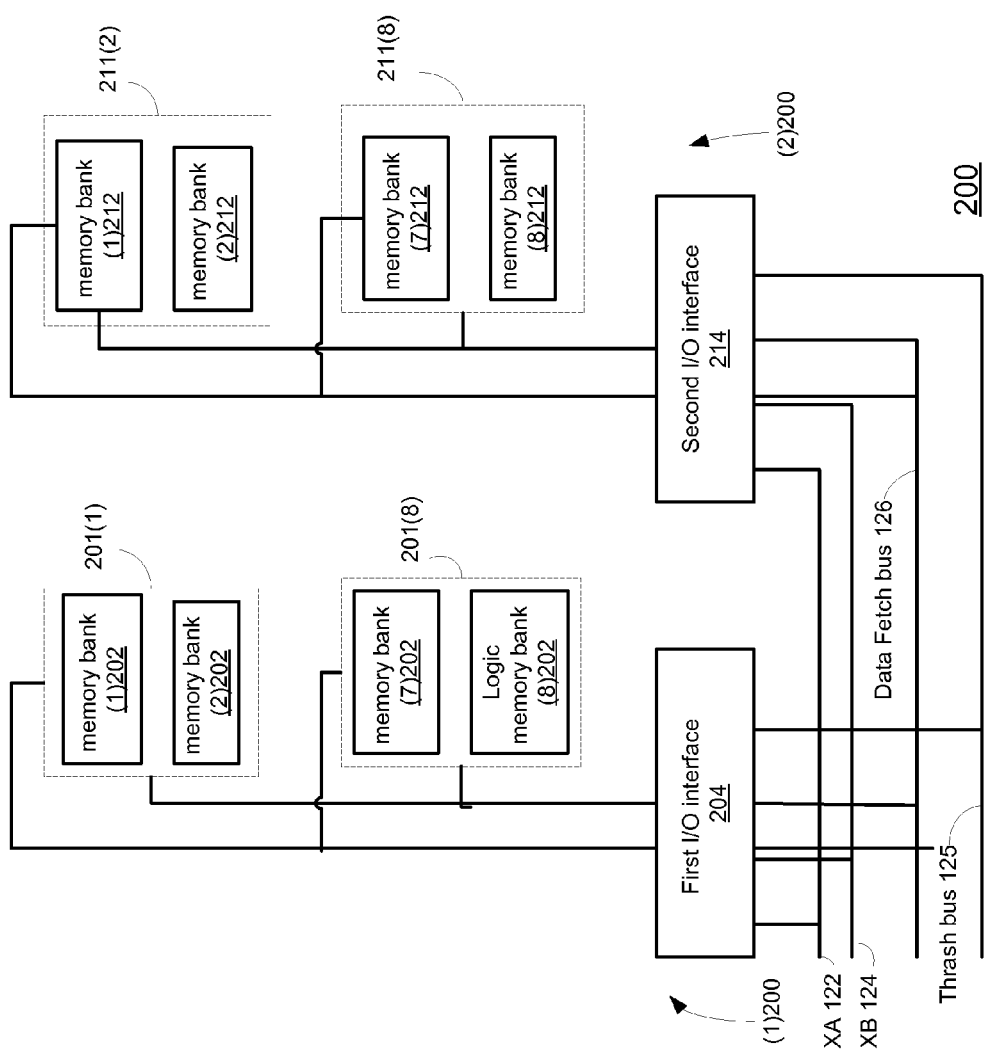
FIG. 5 is a schematic illustration of a structure of the data cache module, according to an embodiment of the invention.

FIG. 5 is a schematic illustration of the structure of data cache module 200, according to an embodiment of the invention. Data cache module 200 includes a controller, although other configuration can be provided, such a configuration in which the controller is not a part of the data cache module. The data cache module can be connected to one or more controller.

The cache module 200 is divided to two groups 200(1) and 200(2). The first group 200(1) includes four memory banks 201(2), 201(4), 201(6) and 201(8), each bank including two virtual memory banks (202(1), 202(2)), (202(3), 202(4)), (202(5), 202(6)), and (202(7), 202(8)), respectively and a first I/O interface module 204.

The second group 200(2) includes four memory banks 211(2), 211(4), 211(6) and 211(8), each bank including two virtual memory banks (212(1), 212(2)), (212(3), 212(4)), (212(5), 212(6)), and (212(7), 212(8)), respectively and a second I/O interface module 214.

Each memory bank is arranged as an array that includes sixty-four 256-bit wide rows. The addresses of the four memory banks that form each group are interleaved to reduce memory contentions. The addresses of pairs of virtual memory banks that belong to the same memory bank are not interleaved.

The first I/O interface module 204 is connected in parallel, by two buses, to four memory banks 201(2)-201(8) and the second I/O interface module 214 is connected in parallel, by two buses, to memory banks 211(2)-211(8).

A data cache module 200, as well as sub-system 100 has a finite capability of managing simultaneous information transfers. For example, data cache module contention may occur when the module receives two simultaneous access requests to different addresses within the same virtual memory bank. The access requests can be a part of read or write operations. In such a case one of the access requests is serviced after the other. This may cause processor 110 to stall. The finite capability is also expressed by the need to arbitrate between various bus requests, as implemented by the DCU 150. It this case the core can also be stalled.

The data cache module 200, and especially the cache logic 210, is connected to a controller, such as DFU 170, to provide indications about cache events. The requests of the DFU 170, as well as requests from various supporting units, such as the WBB 180 to complete write back operations, and sent to DCU 150 that arbitrates between the various requests. These various components exchange fetch request and fetch acknowledgement signals. The CACHE_A_HIT/MISS 201 signal is asserted in response to an occurrence of a cache miss event associated with a request to retrieve data over the first data bus XA 122. This signal is negated when a corresponding cache hit event occurs. The CACHE_B_HIT/MISS 203 signal is asserted in response to an occurrence of a cache miss event associated with a request to retrieve data over the second data bass XB 124. This signal is negated when a corresponding cache hit event Cache module 220 may also include buffering means connected to the first data bus XA 122, to the second data bus 124 and/or to the data fetch bus 126.

Figure 6:
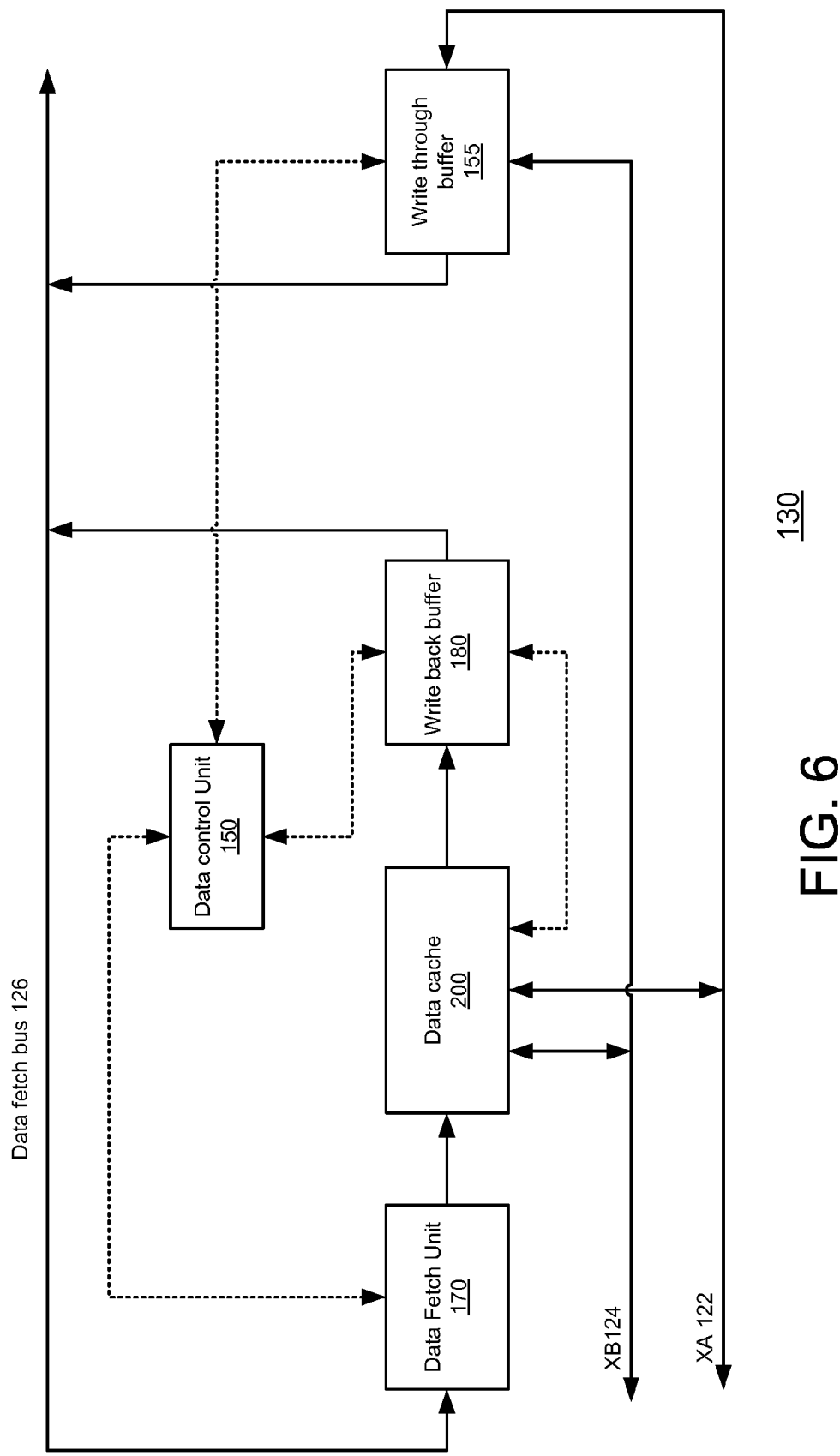
FIG. 6 is a detailed description of a data channel, according to an embodiment of the invention.

FIG. 6 is a schematic illustration of data channel 130, according to an embodiment of the invention.

Various components of the data channel 130, including cache module 200, WTB 155, DFU 170 and WBB 180 can access a bus that is connected to other memory modules, such as high-level memory module 50. The requests are sent to DCU 150 that arbitrates between the bus requests. Conveniently, requests to fetch data to data cache 200 are generated by DFU 170 and sent to DCU 150.

DFU 170 is capable of determining a fetching scheme that in turn can include mandatory fetch operations as well as speculative fetch operations. The speculative fetch operations associated with different mandatory information units can be interlaced, but this is not necessarily so.

WBB 180 has eight entries of 256-bit each, for storing up to sixteen BDUs at a time. It has an input bus and an output bus.

WBB 180 is adapted to receive information units from the cache module 200 and send the information units to the high-level memory module 50. WBB 180 has limited buffering capabilities and is capable of separating between a reception of information units from the cache module 200 and between writing the information units to the high-level memory module 50. Usually, before new BDUs are written to the cache module 200 the cache module 200 automatically transfers BDUs that have a lower probability of being re-read (usually older BDUs). It is noted that a BDU can be cache-locked, meaning that it is not thrashed.

WBB 180 is capable of generating a high-priority bus request and a low priority-bus request for sending at least one information unit to the high-level memory module 50. High-priority bus requests are generated in various scenarios, such as a reception of a flush instruction, full or almost full WBB state, and possible WBB incoherency event. A flush instruction forces the entire content of the WBB 180 to be sent to the high-level memory module 50.

A WBB incoherency event may occur when a processor requests an information unit that is stored within WBB 180. This information was flushed from the cache module 200 thus it can cause a cache miss event. A mandatory fetch operation to retrieve that information unit can eventually send an obsolete information unit to the processor 110. Instead, once WBB 180 detects that such an event can occur it sends its content to high-level memory module 50, waits until high-level memory module 50 is updated, and allows high-priority memory module 50 to send the updated information unit to the processor 110.

The WTB 155 facilitates write through operations. It includes six entries. It is connected to the first and second data buses XA 122 and XB 124. It also has an output data bus. It is adapted to receive two entries at a time. It is capable of issuing write through requests of various priorities. Conveniently, the priority of the write through requests is higher that the priority of pre-fetch requests. WTB 155 can issue higher priority bus requests when processor 110 is stalled until the write through operation is completed.

The processor 110 can execute various coherency related operations including address range invalidation, address range synchronization and address range flush. Address range invalidation may involve resetting the valid and dirty bits associated with the relevant BDUs.

According to an embodiment of the invention processor 110 may define the data memory policy for each cache memory set of lines. This cache memory set of lines may correspond to a way but this is not necessarily so. A cache write-back policy is conveniently applied to data that is to be re-used by a program. In such a case multiple write operations to the cache do not necessarily amount in multiple transaction to the high-level memory module 50. On the other hand, if there is a low probability that certain data segment will be re-used then the write through policy can be implemented.

There are various well-known manners to convey the data memory policy. It is assumed that the data memory policy is implemented by processor 110 that inserts appropriate values in a certain control register. MMU 300 in turn sends control signals that define the manner in which data unit is written to the data channel 130. Such a control register can include two bits that define if the data memory policy is cacheable write through, cacheable write back or non-cacheable write through. In response, MMU 300 sends appropriate control signals to the various buffers and cache, including WBB 180 and WTB 155. The content of the certain control register may be varied, according to the cache memory set of line that is involved.

When applying a cacheable write back policy data that is written to the data cache module 200 is sent to the high-level memory module 50 only through WBB 180. When applying cacheable write through policy processor 110 is not stalled, unless a hazard is detected, and data is written both to the data cache module 200 and to WTB 155. Data is not written to the data cache module 200 until its corresponding DBU is valid. Processor 110 can be stalled when applying a non-cacheable write through policy. Those of skill in the art will appreciate that other data memory policies can be applied, without departing from the scope of the invention.

DCU 150 arbitrates between various bus requests initiated by various components of the data channel 130, including the DFU 170, the WTB 155, the TWB 160 and the WBB 180. DCU 150 can apply various well-known arbitration schemes. Usually, the DCU 150 will arbitrate between various bus requests according to the following priority: high-priority bus requests from an optional trace buffer within data cache (used for trace operations); high-priority bus requests from the WBB 180; previous information unit bus requests from the WTB 155, mandatory fetch requests from the DFU 170; low-priority bus requests from the WTB 155; speculative fetch requests from the DFU 170 and finally low-priority bus requests from the WBB 180.

DCU 150 can sends acknowledgement messages to a requesting component, if a request that is sent from that component has won an arbitration cycle. DCU 150 includes an internal request queue and can arbitrate between various requests according to their priority.

According to an embodiment of the invention when a write through request 274 is sent by processor 110, cache module 200 can delay its miss/hit determination until receiving an indication that DFU 170 is empty—meaning that if a speculative fetch operation was in progress when the write through request was received then this speculative fetch operation ended and the speculatively fetched information units are stored in cache module 200.

The DFU 170 can be emptied from data by delaying the execution of speculative fetch operations that were requested by DFU 170 but were not started by DCU 150. The delay process within DFU 170 can be implemented in various manners known in the art. It can include masking low priority requests such as speculative fetch requests, freezing the arbitration process, and the like.

According to yet another embodiment of the invention the delaying of the hit/miss decision is responsive to the address of the information unit. If the address belongs to a predefined memory range the delay takes place. Otherwise, the hit/miss determination is executed without delay.

Figure 7:
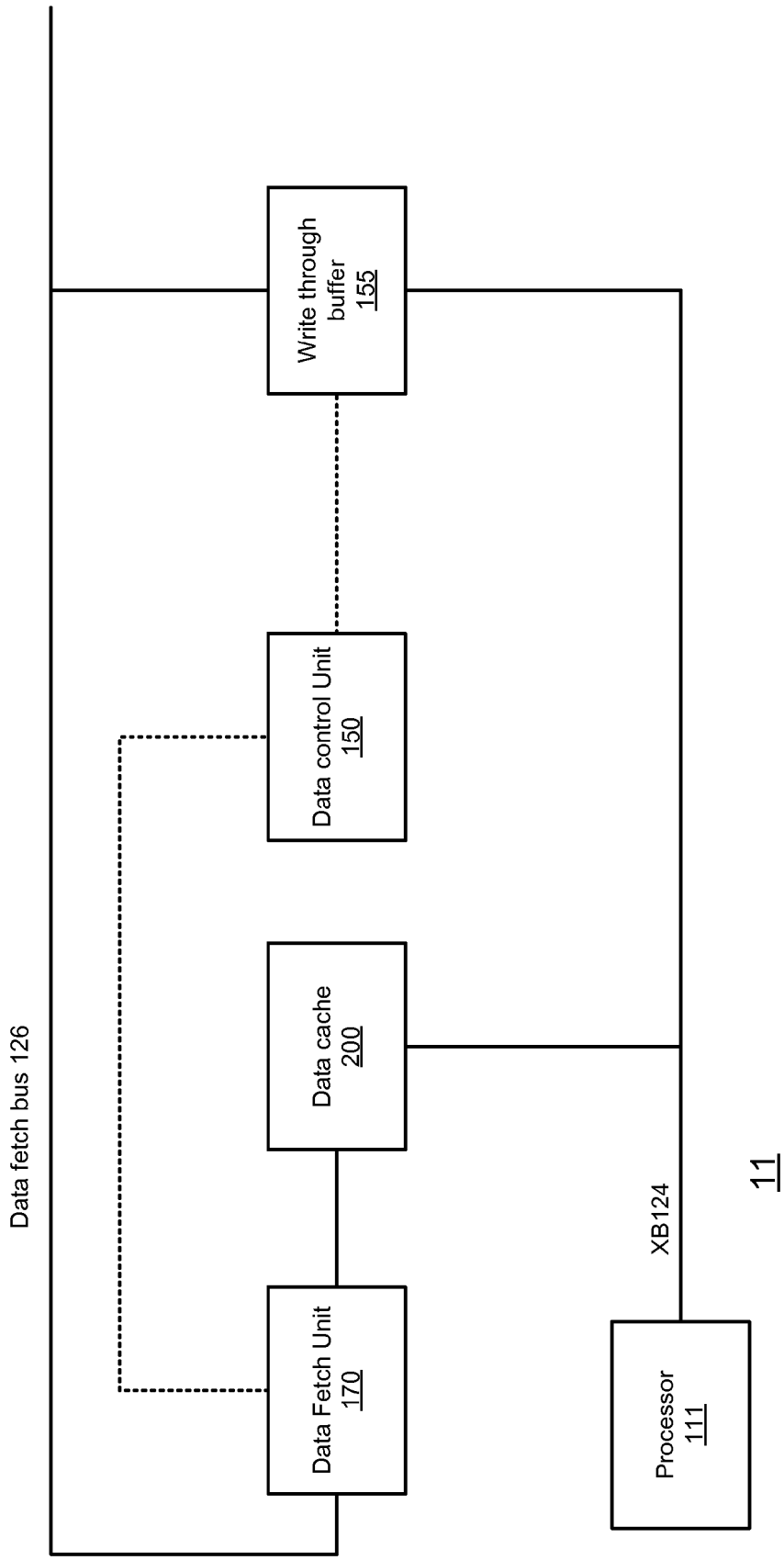
FIG. 7 is a schematic illustration of a device, according to an embodiment of the invention.

FIG. 7 is a schematic illustration of A DEVICE 11, according to another embodiment of the invention.

Device 11 includes DFU 170, data cache 200 DCU 150 and WTB 155. A processor 111 that has a single data bus (XA 124) is connected to data cache 200 and to WTB 155. data cache 200 is also connected to DFU 170. DFU 170 is connected to DCU 150. DCU 150 is also connected to WTB 155. Data fetch bus 126 is connected to WTB 155 and DFU 170. It is noted that device 11 can implement any of the mentioned below methods. Device 11 differs from device 10 by including a single data bus and a single data bus processor, as well as including less components. The manner in which WTB 155, data cache 200, DFU 170 and DCU 150 operate is illustrated in reference to FIG. 1-FIG. 5.

Figure 8:
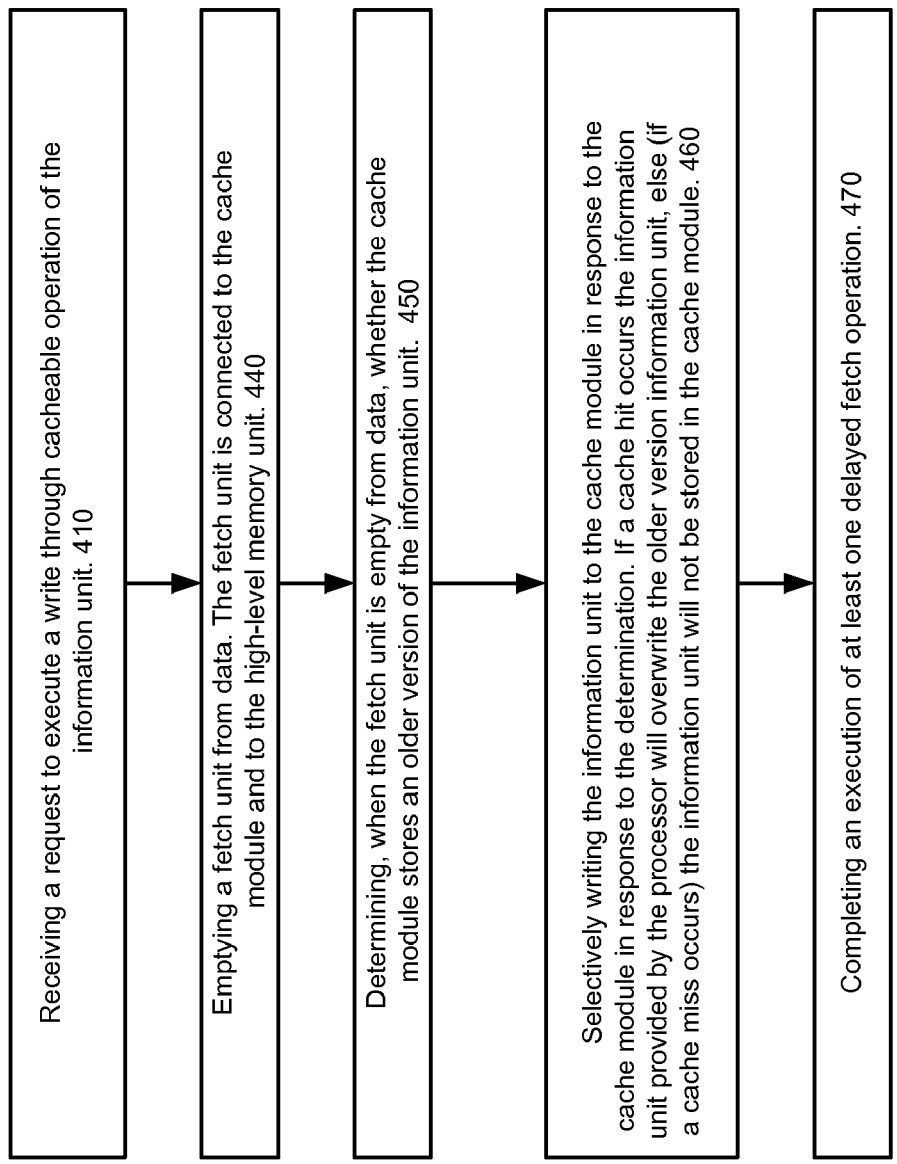
FIG. 8 is a flow chart of a method for fetching an information unit, according to an embodiment of the invention.

FIG. 8 illustrates method 400 for fetching an information unit according to an embodiment of the invention.

Method 400 starts by stage 410 of receiving a request to execute a write through cacheable operation of the information unit. Referring to the example set fourth in previous drawings, processor 110 provides a request to execute a write through cacheable operation. During this operation an information unit that appears on either one of busses XA 122 or XB 124 is written to a write through buffer (such as WTB 155) and then, via data fetch bus 126 to a high-level memory. The write through cacheable operation also include writing the information unit to cache module 200, if cache module 200 stores an older version of the information unit.

Stage 410 is followed by stage 440 of emptying a fetch unit from data. The fetch unit can initiate speculative and mandatory fetch operations. This fetch unit is connected to the cache module and to the high-level memory unit.

Conveniently, stage 440 of emptying includes completing an execution of currently executed speculative fetch operations and delaying an execution of requested speculative fetch operations that were not started.

Conveniently, stage 440 of emptying includes sending to an arbiter that controls an access to the high level memory unit, a write through request. The write through request has a higher priority than requests to perform speculative fetch operations. Thus, write through requests and not speculative fetch operation will be executed, thus allowing to empty the fetch unit.

Stage 440 is followed by stage 450 of determining, when the fetch unit is empty, whether the cache module stores an older version of the information unit. This stage includes determining whether the information unit provides by the processor will cause a hit or a miss.

Conveniently, stage 450 of determining whether the cache module stores a version of the information unit is preceded by receiving, by the cache module an empty data indication from the fetch unit.

Stage 450 is followed by stage 460 of selectively writing the information unit to the cache module in response to the cache module in response to the determination. If a cache hit occurs the information unit provided by the processor will overwrite the older version information unit, else (if a cache miss occurs) the information unit will not be stored in the cache module.

Conveniently, stage 460 of selectively writing includes writing the information unit from a write through buffer to the high level memory unit.

Stage 460 is followed by optional stage 470 of completing an execution of a delayed fetch operation.

Figure 9:
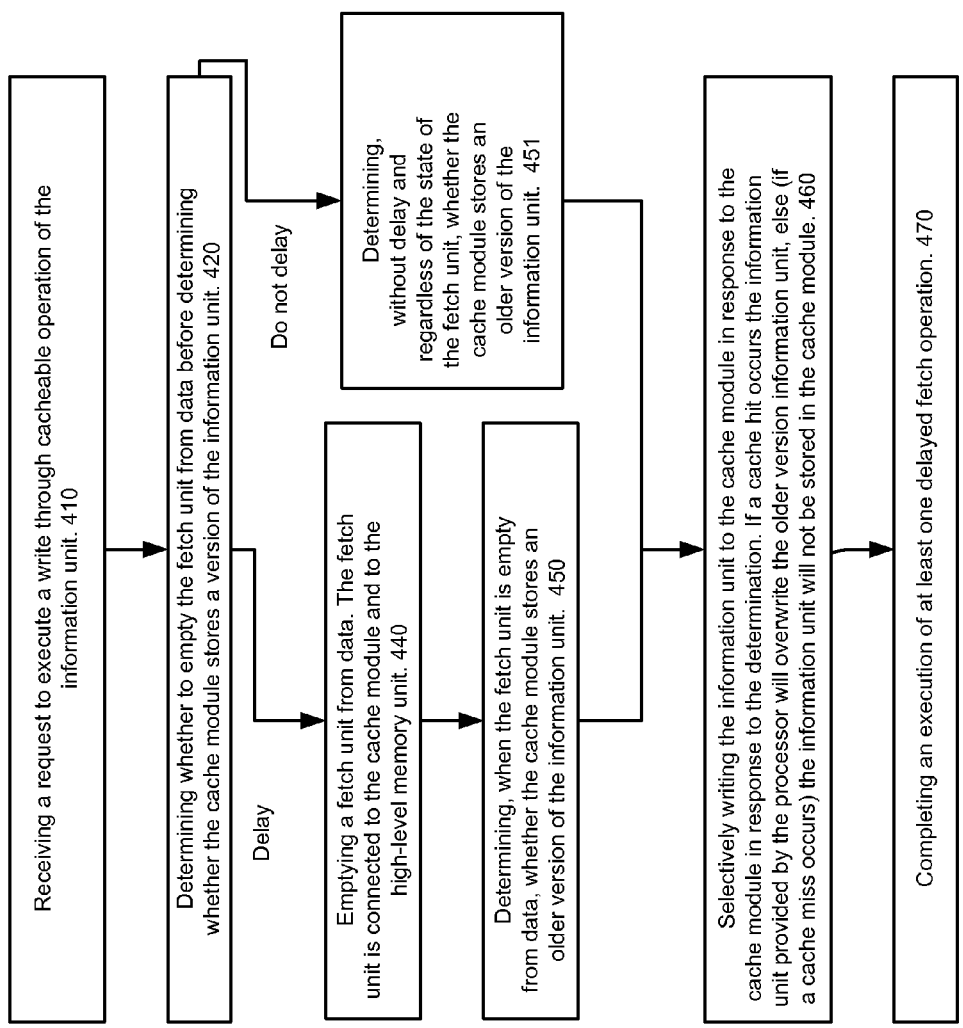
FIG. 9 is a flow chart of a method for fetching an information unit, according to another embodiment of the invention.

FIG. 9 illustrates method 500 for fetching an information unit according to another embodiment of the invention.

Method 500 enables to delay the hit/miss determination only in certain circumstances. In other circumstances the hit/miss determination is not delayed but the coherency problem is less significant.

Method 500 differs from method 400 of FIG. 8 by including stages 420 and optional stage 451.

Stage 420 includes determining whether to empty the fetch unit from data before determining whether the cache module stores a version of the information unit. Stage 420 of determining may include comparing an address of the information unit to a predefined range of addresses.

Referring to the example set fourth in previous drawings, predefined address range comparator 244 can compare a received address to a predefined range of addresses and determine whether to stall the hit/miss determination by sending control signals to timing controller 242.

If there is a need to delay the hit/miss determination stage 420 is followed by stages 440-470.

If there is no need to delay the hit/miss determination then stage 420 is followed by stage 451 of determining, without delay and regardless of an emptiness level of the fetch unit, whether the cache module stores an older version of the information unit. This stage includes determining whether the information unit provides by the processor will cause a hit or a miss.

Stage 451 is followed by stage 460.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for fetching an information unit, the method comprises:
   receiving a request to execute a write through cacheable operation of the information unit;
   emptying a fetch unit of data stored at the fetch unit, wherein the fetch unit is coupled to a cache module and to a high level memory unit;
   receiving at the cache module an indication that the fetch unit is empty;
   determining, in response to receiving the indication that the fetch unit is empty, whether the cache module stores an older version of the information unit; and
   selectively writing the information unit to the cache module in response to the determination.

2. The method according to claim 1 wherein the emptying comprises:
   completing an execution of currently executed speculative fetch operations and delaying an execution of requested speculative fetch operations that were not started.

3. The method according to claim 1 wherein the emptying comprises:
   sending to an arbiter that controls an access to the high level memory unit, a write through request;
   wherein the write through request has a higher priority than requests to perform speculative fetch operations.

4. The method according to claim 1 wherein the selective writing also comprises writing the information unit from a write through buffer to the high level memory unit.

5. The method according to claim 1 wherein the receiving the request to execute a write through cacheable operation is followed by determining whether to empty the fetch unit of data stored at the fetch unit before determining whether the cache module stores a version of the information unit.

6. The method according to claim 5 wherein the determining whether to empty the fetch unit comprises comparing an address of the information unit to a predefined range of addresses.

7. The method according to claim 1 wherein the selectively writing is followed by completing an execution of a delayed fetch operation.

8. A device adapted to fetch an information unit, the device comprises:
   a processor adapted to generate a request to execute a write through cacheable operation of the information unit;
   a cache module adapted to receive an indication that a fetch unit is empty, and in response to receiving the indication that the fetch unit is empty, determine whether the cache module stores an older version of the information unit and selectively store the information unit in response to the determination; and
   an arbiter adapted to empty the fetch unit;
   wherein the fetch unit is coupled to the cache module and to a high level memory.

9. The device according to claim 8 wherein the arbiter is adapted to complete an execution of currently executed speculative fetch operations and to delay an execution of requested speculative fetch operations that were not started.

10. The device according to claim 8 wherein the device is adapted to send to the arbiter a write through request wherein the write through request has a higher priority than requests to perform speculative fetch operations.

11. The device according to claim 8 wherein the device comprises a write through buffer adapted to generate requests to write the information unit to the high level memory unit.

12. The device according to claim 8 wherein the device is adapted to determine whether to empty the fetch unit from data before determining whether the cache module stores a version of the information unit.

13. The device according to claim 12 wherein the device is adapted to compare between an address of the information unit and between a predefined address range and in response determine whether to empty the fetch unit from data before determining whether the cache module stores a version of the information unit.

14. The device according to claim 8 wherein the device is adapted to complete an execution of a delayed fetch operation.

15. The method according to claim 2 wherein the emptying comprises:
   sending, to an arbiter that controls an access to the high level memory unit, a write through request;
   wherein the write through request has a higher priority than requests to perform speculative fetch operations.

16. The method according to claim 2 wherein the selective writing also comprises writing the information unit from a write through buffer to the high level memory unit.

17. The method according to claim 3 wherein the receiving the request to execute a write through cacheable operation is followed by determining whether to empty the fetch unit of data stored at the fetch unit before determining whether the cache module stores a version of the information unit.

* * * * *